United States Patent
Volponi

(10) Patent No.: US 7,788,014 B2
(45) Date of Patent: Aug. 31, 2010

(54) PROCESS AND METHODOLOGY FOR ROOT CAUSE IDENTIFICATION IN GAS TURBINE ENGINE PERFORMANCE TRACKING

(75) Inventor: Allan J. Volponi, West Simsbury, CT (US)

(73) Assignee: United Technologies Corporation, Hartford, CT (US)

(*) Notice: Subject to any disclaimer, the term of this patent is extended or adjusted under 35 U.S.C. 154(b) by 846 days.

(21) Appl. No.: 11/714,329

(22) Filed: Mar. 5, 2007

(65) Prior Publication Data

US 2008/0221835 A1    Sep. 11, 2008

(51) Int. Cl.
G06F 19/00    (2006.01)

(52) U.S. Cl. .......................................... 701/100; 701/29

(58) Field of Classification Search .................. None
See application file for complete search history.

(56) References Cited

U.S. PATENT DOCUMENTS

| | | |
|---|---|---|
| 5,105,372 A | 4/1992 | Provost et al. |
| 5,447,059 A | 9/1995 | Miller et al. |
| 6,606,580 B1 | 8/2003 | Zedda et al. |
| 6,760,689 B2 | 7/2004 | Follin et al. |
| 6,804,612 B2 | 10/2004 | Chow et al. |
| 6,909,960 B2 | 6/2005 | Volponi et al. |
| 6,962,043 B2 | 11/2005 | Venkateswaran et al. |
| 7,031,878 B2 | 4/2006 | Cuddihy et al. |
| 7,136,809 B2 | 11/2006 | Volponi |
| 7,140,186 B2 | 11/2006 | Venkateswaran et al. |
| 7,571,057 B2 * | 8/2009 | D'Amato et al. .............. 702/33 |
| 2004/0088100 A1 | 5/2004 | Volponi |
| 2004/0153815 A1 | 8/2004 | Volponi |
| 2008/0039993 A1* | 2/2008 | Cleary et al. .................. 701/29 |

* cited by examiner

Primary Examiner—Michael J. Zanelli
(74) Attorney, Agent, or Firm—Bachman & LaPointe, P.C.

(57) ABSTRACT

A system and method for narrowing an assessment of root cause to a single stage within a gas turbine engine module using coupling factors and known instrumentation non-repeatability. Embodiments examine certain root cause (RC) effects that manifest themselves as coupling levels, or ratios (CR), between an engine module's efficiency change $\Delta\eta$ and its flow parameter change $\Delta FP$.

7 Claims, 5 Drawing Sheets

| $\Delta\hat{\eta}$ | Estimated Coupling Ratio $\hat{CR}$ | | | | | | | | |
|---|---|---|---|---|---|---|---|---|---|
| | 0.5 | 0.75 | 1 | 1.25 | 1.5 | 1.75 | 2 | 2.25 | 2.5 |
| 1 | 0.54 | 0.56 | 0.59 | 0.63 | 0.67 | 0.71 | 0.76 | 0.82 | 0.87 |
| 1.25 | 0.48 | 0.50 | 0.53 | 0.56 | 0.60 | 0.64 | 0.68 | 0.73 | 0.78 |
| 1.5 | 0.44 | 0.46 | 0.48 | 0.51 | 0.55 | 0.58 | 0.62 | 0.67 | 0.71 |
| 1.75 | 0.41 | 0.42 | 0.45 | 0.47 | 0.50 | 0.54 | 0.58 | 0.62 | 0.66 |
| 2 | 0.38 | 0.40 | 0.42 | 0.44 | 0.47 | 0.51 | 0.54 | 0.58 | 0.62 |
| 2.25 | 0.36 | 0.37 | 0.39 | 0.42 | 0.45 | 0.48 | 0.51 | 0.54 | 0.58 |
| 2.5 | 0.34 | 0.35 | 0.37 | 0.40 | 0.42 | 0.45 | 0.48 | 0.52 | 0.55 |
| 2.75 | 0.32 | 0.34 | 0.36 | 0.38 | 0.40 | 0.43 | 0.46 | 0.49 | 0.53 |
| 3 | 0.31 | 0.32 | 0.34 | 0.36 | 0.39 | 0.41 | 0.44 | 0.47 | 0.50 |
| 3.25 | 0.30 | 0.31 | 0.33 | 0.35 | 0.37 | 0.40 | 0.42 | 0.45 | 0.48 |
| 3.5 | 0.29 | 0.30 | 0.32 | 0.33 | 0.36 | 0.38 | 0.41 | 0.44 | 0.47 |
| 3.75 | 0.28 | 0.29 | 0.30 | 0.32 | 0.34 | 0.37 | 0.39 | 0.42 | 0.45 |
| 4 | 0.27 | 0.28 | 0.29 | 0.31 | 0.33 | 0.36 | 0.38 | 0.41 | 0.44 |
| 4.25 | 0.26 | 0.27 | 0.29 | 0.30 | 0.32 | 0.35 | 0.37 | 0.40 | 0.42 |
| 4.5 | 0.25 | 0.26 | 0.28 | 0.30 | 0.31 | 0.34 | 0.36 | 0.39 | 0.41 |
| 4.75 | 0.25 | 0.26 | 0.27 | 0.29 | 0.31 | 0.33 | 0.35 | 0.38 | 0.40 |
| 5 | 0.24 | 0.25 | 0.26 | 0.28 | 0.30 | 0.32 | 0.34 | 0.37 | 0.39 |

FIG. 2

| | All Rotors | Rotor 5 | Rotors 8-12 | Rotors 13-15 | IGV |
|---|---|---|---|---|---|
| CR | 0.48 | 0.83 | 0.37 | 0.22 | 1.63 |
| | All Rotors | Rotor 5 | Rotors 8-12 | Rotors 13-15 | IGV |
| -0.8 | 2.0% | 0.0% | 11.1% | 86.9% | 0.0% |
| -0.6 | 3.0% | 0.0% | 13.7% | 83.3% | 0.0% |
| -0.4 | 4.8% | 0.0% | 17.6% | 77.5% | 0.0% |
| -0.2 | 8.4% | 0.1% | 23.0% | 68.5% | 0.0% |
| 0 | 14.5% | 0.5% | 29.0% | 56.1% | 0.0% |
| 0.2 | 23.2% | 2.2% | 33.4% | 41.2% | 0.0% |
| 0.4 | 31.7% | 8.9% | 33.0% | 26.4% | 0.0% |
| 0.6 | 33.8% | 26.1% | 26.1% | 14.1% | 0.0% |
| 0.8 | 26.7% | 50.5% | 15.9% | 6.2% | 0.7% |
| 1 | 16.3% | 65.6% | 7.9% | 2.3% | 7.9% |
| 1.2 | 6.9% | 50.4% | 2.8% | 0.7% | 39.2% |
| 1.4 | 1.8% | 21.1% | 0.7% | 0.1% | 76.3% |
| 1.6 | 0.4% | 7.4% | 0.1% | 0.0% | 91.9% |
| 1.8 | 0.1% | 3.0% | 0.0% | 0.0% | 96.8% |
| 2 | 0.1% | 1.5% | 0.0% | 0.0% | 98.5% |
| 2.2 | 0.0% | 0.8% | 0.0% | 0.0% | 99.1% |
| 2.4 | 0.0% | 0.6% | 0.0% | 0.0% | 99.4% |
| 2.6 | 0.0% | 0.4% | 0.0% | 0.0% | 99.6% |
| 2.8 | 0.0% | 0.3% | 0.0% | 0.0% | 99.6% |
| 3 | 0.0% | 0.3% | 0.0% | 0.0% | 99.7% |

FIG. 4A

|     | All Rotors | Rotor 5 | Rotors 8-12 | Rotors 13-15 | IGV |
|-----|-----------|---------|-------------|--------------|-----|
| CR  | 0.48      | 0.83    | 0.37        | 0.22         | 1.63 |
|     | All Rotors | Rotor 5 | Rotors 8-12 | Rotors 13-15 | IGV |
| -0.8 | 0.0% | 0.0% | 0.0% | 100.0% | 0.0% |
| -0.6 | 0.0% | 0.0% | 0.1% | 99.9% | 0.0% |
| -0.4 | 0.0% | 0.0% | 0.3% | 99.7% | 0.0% |
| -0.2 | 0.0% | 0.0% | 1.2% | 98.7% | 0.0% |
| 0 | 0.4% | 0.0% | 6.7% | 92.9% | 0.0% |
| 0.2 | 6.6% | 0.0% | 28.2% | 65.2% | 0.0% |
| 0.4 | 37.7% | 0.2% | 44.1% | 18.0% | 0.0% |
| 0.6 | 57.5% | 20.4% | 20.4% | 1.7% | 0.0% |
| 0.8 | 7.2% | 91.9% | 0.9% | 0.0% | 0.0% |
| 1 | 0.4% | 99.6% | 0.0% | 0.0% | 0.0% |
| 1.2 | 0.0% | 73.2% | 0.0% | 0.0% | 26.8% |
| 1.4 | 0.0% | 0.6% | 0.0% | 0.0% | 99.4% |
| 1.6 | 0.0% | 0.0% | 0.0% | 0.0% | 100.0% |
| 1.8 | 0.0% | 0.0% | 0.0% | 0.0% | 100.0% |
| 2 | 0.0% | 0.0% | 0.0% | 0.0% | 100.0% |
| 2.2 | 0.0% | 0.0% | 0.0% | 0.0% | 100.0% |
| 2.4 | 0.0% | 0.0% | 0.0% | 0.0% | 100.0% |
| 2.6 | 0.0% | 0.0% | 0.0% | 0.0% | 100.0% |
| 2.8 | 0.0% | 0.0% | 0.0% | 0.0% | 100.0% |
| 3 | 0.0% | 0.0% | 0.0% | 0.0% | 100.0% |

FIG. 4B

PROCESS AND METHODOLOGY FOR ROOT CAUSE IDENTIFICATION IN GAS TURBINE ENGINE PERFORMANCE TRACKING

BACKGROUND OF THE INVENTION

The invention relates generally to the field of gas turbine engine modeling. More specifically, the invention relates to methods and systems for narrowing an assessment of root cause to a single turbine or compressor stage, or a combination of stages within a module using coupling factors and known instrumentation non-repeatability.

The area of gas turbine performance diagnostics concerns tracking changes in engine module performance measures, such as efficiency and flow parameters, as the engine deteriorates over time. The engine modules that are tracked are typically the compressor and turbine elements of an engine. The primary sources of information driving this methodology are measurements taking along the engine's gas path, such as temperatures, pressures, speeds, etc. The performance parameters such as changes in module efficiency and module flow characterization are useful in isolating long-term deterioration effects down to the engine module level, but do not address the root cause for the degradation within the module.

Current module performance analysis (MPA) methods use steady state cruise data to perform the isolation. The parameters that are monitored are typically speeds, temperatures, and pressures taken at various stages across the engine's gas path. When a shift in these measured quantities is detected, a % Δ is computed for each of these gas path parameters, capturing the level and direction of the shift. This vector of measurement parameter Δs forms the principle piece of information from which the MPA is performed. This is effectively a pattern matching methodology, wherein the analysis compares the computed % Δ vector to a series of such vectors representing known faults and the best match is selected.

Current methods in performance tracking provide diagnostic visibility to the module level. For example, in a twin spool turbofan engine the modules under consideration are the Fan, Low Pressure Compressor (LPC), High Pressure Compressor (HPC), High Pressure Turbine (HPT), and the Low Pressure Turbine (LPT). The major modules will differ depending on whether the gas turbine engine under consideration is a single spool, double spool, or triple spool. Depending on the particular engine application, most of the modules have several stages of fixed (stators/guide vanes) and rotating (rotors) assemblies. Extending diagnostic visibility to a single stage or set of stages within a given module would have a direct impact on planning maintenance activities and logistics.

SUMMARY OF THE INVENTION

The inventor has discovered that it would be desirable to have a system and method for narrowing an assessment of root cause to a single compressor or turbine stage or combination of stages within a module using coupling factors and known instrumentation non-repeatability. Embodiments examine certain root cause (RC) effects that manifest themselves as coupling levels, or ratios (CR), between an engine module's efficiency change Δη and its flow parameter change ΔFP. For compression modules, the flow parameter is typically the compressor flow capacity and for turbine modules, the flow parameter is typically taken to be a nozzle area.

One aspect of the invention provides a method for narrowing an assessment of root cause RC to a single turbine or compressor stage, or a combination of stages within a gas turbine engine module. Methods according to this aspect of the invention include inputting engine gas path measurement data, performing a gas path analysis on the gas path measurement data to derive % Δ performance vectors, calculating estimated module efficiency $\hat{\eta}$ and flow parameter $\hat{FP}$ deltas (Δ's) for each % Δ performance vector, calculating a coupling ratio $\Delta\hat{CR}$ for each % Δ performance vector, calculating a variability for each coupling ratio $\Delta\hat{CR}$, calculating a level-of-belief $lob(\Delta\hat{CR}, RC_i)$ for each coupling ratio $\Delta\hat{CR}$ and each root cause $RC_i$, calculating a confidence level for each module $RC_k$, and selecting a module root cause RC having a maximum confidence level.

Another aspect is where the variability further comprises calculating a mean Z, a variance $\sigma^2(i)$ and covariance $\sigma_{CR}$ for each % Δ performance vector.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is an exemplary table comparing estimated coupling ratios $\hat{CR}$ with estimated sample variability $\Delta\hat{\eta}$.

FIG. 4A is an exemplary table comparing root cause confidence measures with coupling ratios CR.

FIG. 4B is an exemplary table comparing root cause confidence measures with coupling ratios CR.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein if for the purpose of description and should not be regarded as limiting. The use of "including," "comprising," or "having," and variations thereof herein is meant to encompass the items listed thereafter and equivalents thereof as well as additional items. The terms "mounted," "connected," and "coupled," are used broadly and encompass both direct and indirect mounting, connecting, and coupling. Further, "connected," and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention.

Gas turbine performance diagnostics concerns itself with tracking changes in engine module performance measures, typically efficiency (Δη) and flow parameters (ΔFP), as the engine deteriorates over time. Embodiments examine certain root cause (RC) effects that manifest themselves as coupling levels, or ratios (CR), between an engine module's efficiency change Δη and its flow parameter change ΔFP.

Figure 1:
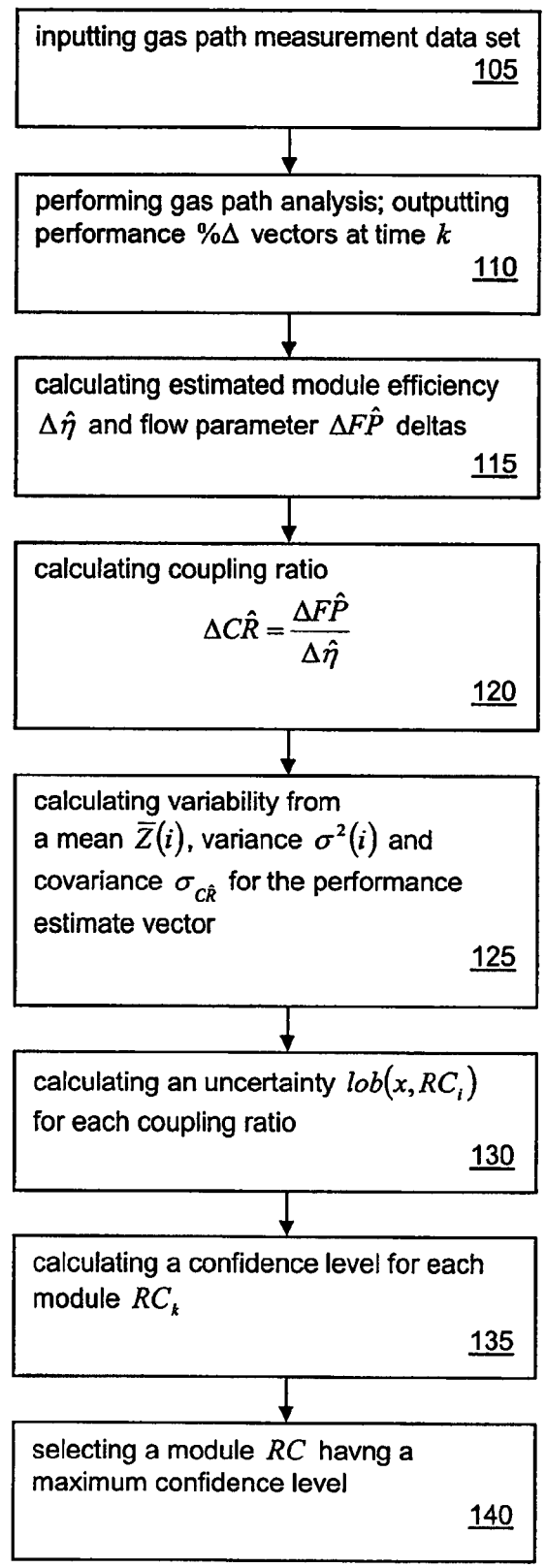
FIG. 1 is an exemplary root cause assessment method.

Methods shown in FIG. 1 begin with collecting a stable steady state gas path measurement set. The data source may be either static test stand data, or stable cruise flight data. Gas path measurements in terms of spool speeds, interstage temperatures, pressures, fuel flow, and power output (test stand) are typical engine parameters that are monitored during test stand runs and during flight. The particular measurement configuration suite will differ somewhat between test stand and flight parameters and with engine type and airframe application. A measure of engine power level is typically available as well as ambient conditions in terms of inlet temperature, pressure, Mach number and altitude (step 105).

With the obtained information, a routine gas path analysis of the data may be performed. This process is known in the art and can be accomplished in a variety of ways. Whatever the particular methodology, a common element is to normalize the data, and then compare the data to a nominal reference level (typically a model of a production engine) to produce a % Δ change from the reference. This provides a set of measurement deltas from the nominal reference (step 110) that form vectors at discrete times k, k+1, k+2, . . . for subsequent performance estimations.

The output of a gas path analysis is a vector of estimated performance deltas. This vector typically comprises efficiency and flow parameter deltas (from nominal) for each major module of the engine. While this differs slightly with engine model and application, it generally covers changes in efficiency Δη and flow parameter ΔFP for the compressors (e.g., Fan, LPC, and HPC) and the turbines (e.g., HPT and LPT). The Δη and ΔFP performance parameters may be estimated in a multitude of ways. To teach the method, a Kalman filter based method for estimating these quantities is used since the Kalman filter is a common approach used in industry.

If Z denotes a vector of performance measurement deltas and $\hat{x}$ denotes a vector of estimated module performance efficiency and flow parameter quantities, the Kalman filter method determines $\hat{x}$ as $$\hat{x} = x_0 + D(Z - Hx_0), \quad (1)$$

where $x_0$ denotes an a priori guess as to what the performance shifts might be ($x_0$ is zero if no information is available), H is a matrix of performance fault signatures referred to as influence coefficients that relate changes in performance parameters (efficiencies and flow parameters) to expected changes in gas path measurements, and D is the Kalman gain matrix which represents an inverse set of relationships to H in that it relates changes in measurement observations to changes in the efficiency and flow parameters (step 115).

Once $\hat{x}$ is calculated, the module efficiency and flow parameter components may be used to determine and estimate coupling ratios $\hat{CR}$ for each module (Fan, LPC, HPC, etc.) (step 120).

The coupling ratio CR is a linear dependency between the efficiency Δη and flow parameter ΔFP, and is expressed as $$CR \text{ (coupling ratio)} = \frac{\Delta FP (\Delta \text{ flow parameter})}{\Delta \eta (\Delta \text{ efficiency})}. \quad (2)$$

For compression elements such as Fan, LPC and HPC, the flow parameter is a flow capacity, and for the turbine elements such as HPT and LPT, this is taken to be a change in nozzle area (ΔA) since turbine inlets are usually choked at higher power conditions where data is recorded for purposes of performance tracking.

Performance simulation studies can provide information indicating the performance impact on a module's coupling ratio for a given stage or rotor, or combination of stages/rotors. This information provides a means of focusing the failure resolution to a specific stage or a combination of stages. A typical example is shown in Table 1 for a compressor.

TABLE 1

| root cause | Compression module stage | CR |
| --- | --- | --- |
| RC1 | All rotors | 0.48 |
| RC2 | Rotor 5 | 0.83 |
| RC3 | Rotors 8-12 | 0.37 |
| RC4 | Rotors 13-15 | 0.22 |
| RC5 | IGV wrong position | 1.63 |

For example, 0.83 would exemplify a problem with the $5^{th}$ stage rotor of the compressor under consideration, whereas a coupling of 0.22 would implicate rotors 13-15. Since the efficiency delta Δη and flow parameter ΔFP for the compressor module are estimates $\Delta\hat{\eta}$, $\Delta\hat{FP}$, the value of a coupling ratio CR is not precise. The noise present in the gas path measurements as well as the inherent limitations of the estimation process being used impose an uncertainty in the calculated CR which is calculated as $$\text{estimated coupling ratio} = \hat{CR} = \frac{\Delta\hat{FP}}{\Delta\hat{\eta}}. \quad (3)$$

If a calculated $\hat{CR}$ value is 0.53, an unknown is created in whether the problem is in the 5th rotor (0.83), rotors 8-12 (0.37), or rotors 13-15 (0.22). The resolution depends on the level of variation present in the gas path measurements from which the efficiency $\Delta\hat{\eta}$ and flow parameter deltas $\Delta\hat{FP}$ were calculated from. The collective variation in measurement inputs will be translated into a variation associated with the CR estimate. Therefore, it is critical to accompany the failure resolution (what stage is at fault) with a confidence metric.

Since $\hat{x}=f(Z)$ (from (1)), any variability (noise) in the measurements (Z) will induce variability (noise) in the estimate $\hat{x}$ and hence, in an estimated coupling factor $\hat{CR}$. The variability in the measurements may be calculated empirically and represented by a measurement covariance matrix, R (step 125). If there are m gas path parameter measurement deltas available (i.e., Z has dimension m×1) then the measurement covariance matrix, R, will be m×m, where the main diagonal elements are the variances of the individual measurement parameters and entries outside the main diagonal are the covariances between pairs of measurement parameters. There are a number of methods known to calculate this matrix. One such method would be an empirical determination from a set of N measurement delta vectors, $(Z_k | k=1, 2, \ldots, N)$ as follows Calculate a mean for each measurement parameter $Z_k$ $$\overline{Z}(i) = \frac{1}{N} \sum_{i=1}^{N} Z_k(i) \text{ for } i = 1, 2, \ldots, m, \quad (4)$$

where $Z_k(i)$ is the $i^{th}$ measurement parameter delta for the $k^{th}$ data point. A variance is calculated for each measurement parameter $$\sigma^2(i) = \frac{1}{N-1} \sum_{k=1}^{N} (Z_k(i) - \overline{Z}(i))^2 \text{ for } i = 1, 2, \ldots, m. \quad (5)$$

Covariances are then calculated $$\sigma(i, j) = \frac{1}{N-1} \sum_{k=1}^{N} (Z_k(i) - \overline{Z}(i))(Z_k(j) - \overline{Z}(j)) \quad (6)$$

for $i, j = 1, 2, \ldots, m$ and $i \neq j$.

The $(i, j)^{th}$ element the measurement covariance matrix R is defined as $$R(i, j) = \begin{cases} \sigma^2(i) & i = j \\ \sigma(i, j) & i \neq j \end{cases}. \quad (7)$$

Once R is determined, the covariance for the performance estimate vector $\hat{x}$ may be determined.

The covariance may be obtained empirically through simulation by generating N noisy measurement vectors and calculating the associated N performance estimates, $\hat{x}_k$, k=1, 2, ..., N, and applying (4), (5), (6) to the variable $\hat{x}(i)$, i=1, 2, ..., n, where n is the number of performance parameters (efficiency and flow parameters). If the Kalman filter method of (1) were used to calculate the performance estimates, the covariance matrix may be computed directly as $$cov(\hat{x}) = DRD^T. \quad (8)$$

In either method, the main diagonal of this matrix yields the variances ($\sigma_{\Delta\hat{\eta}}^2$, $\sigma_{\Delta FP}^2$) for the efficiencies and flow parameters. The corresponding variance for the estimated coupling ratio $\hat{CR}$ given by (3) may be approximated as $$\sigma_{\hat{CR}} \approx \frac{1}{\Delta\hat{\eta}} \sqrt{(\hat{CR})^2 \sigma_{\Delta\hat{\eta}}^2 + \sigma_{\Delta FP}^2} \quad (9)$$

where $\Delta\hat{\eta}$ is the estimated level of (delta) efficiency for the module under consideration and $\hat{CR}$ is the estimated coupling ratio given in (3). This implies that the uncertainty in the module coupling is not only a function of the uncertainty in the efficiency and FP estimates, but also the assessed level of those estimated parameters. FIG. 2 shows a table of calculated values using (9) for a variety of efficiency delta $\Delta\hat{\eta}$ and coupling ratio $\hat{CR}$ values using performance parameter variability ($\sigma_{\Delta\hat{\eta}}$, $\sigma_{\Delta FP}$) that would result from typical measurement non-repeatability values.

As can be seen, there exists a range of variability where a $\hat{CR}$ variability at a high efficiency change $\Delta\hat{\eta}$ (5%) and low estimated coupling ratio $\hat{CR}$ (0.5) is 0.24%, and at a low efficiency change $\Delta\hat{\eta}$ (1%) and high estimated coupling ratio $\hat{CR}$ (2.5) is 0.87%. This variability has a direct impact on any assessment made from root cause information such as that shown in Table 1.

Figure 3:
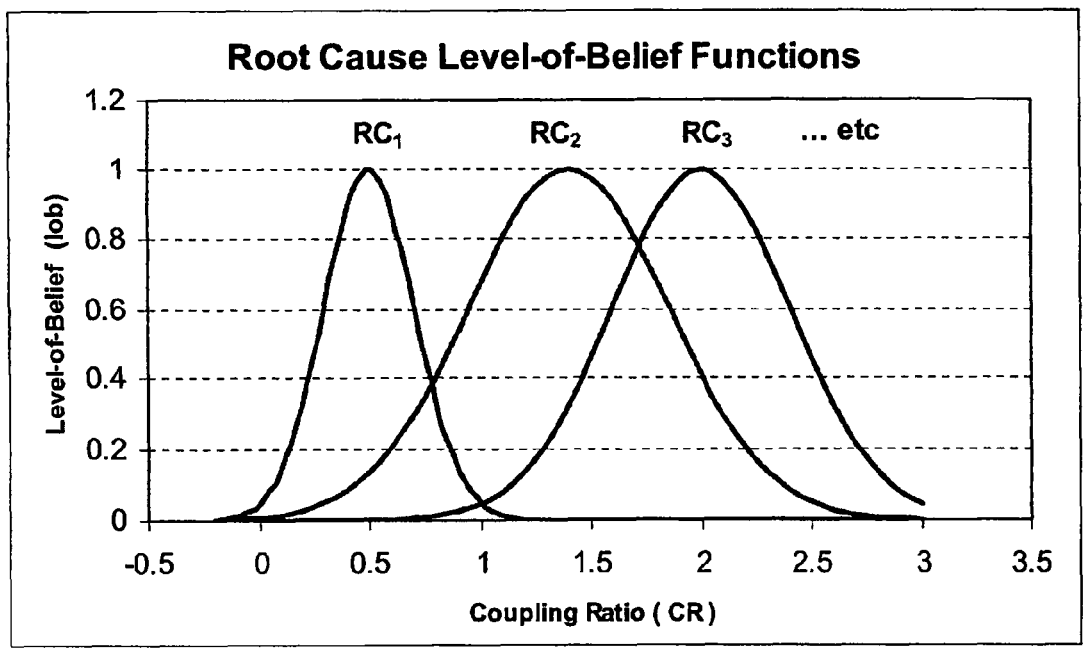
FIG. 3 is an exemplary coupling ratio CR versus level-of-belief lob plot.

To leverage this information, assuming that for a particular engine module such as the HPC under consideration, $M_{RC}$ number of root causes RC exist. In Table 1, for example, $M_{RC}$=5. If the RCs are denoted by $RC_1, RC_2, \ldots, RC_{M_{RC}}$, an associated (nominal) coupling ratio, i.e., $CR_1, CR_2, \ldots, CR_{M_{RC}}$ is arrived at. These latter quantities are the couplings such as those contained in the Table 1. Having computed the expected variation in the efficiency and flow parameter (for this module), the uncertainties in each of the CRs, i.e., $\sigma_{CR_1}, \sigma_{CR_2}, \ldots, \sigma_{CR_{MRC}}$ may be computed (9). A Gaussian level-of-belief (lob) distribution is constructed for each of the RCs that will be centered around the coupling ratio $CR_i$ and having variability $\sigma_{CR_i}$ $$lob(x, RC_i) = e^{-\frac{1}{2}\left(\frac{x - CR_i}{\sigma_{CRi}}\right)^2}, \quad (10)$$

where the abscissa is the estimate coupling ratio $\hat{CR}$ and the ordinate is the level-of-belief (dimensionless) (step 130). FIG. 3 shows a graphical illustration of these distributions.

Therefore, for a given estimated level of CR, an lob may be generated and the fault may be labeled as RC1, RC2, ... etc. To compute a level of confidence associated with the statement that the fault is the $k^{th}$ root cause $RC_k$, the lob may be divided by the sum of all the lobs across the entire set of RCs. In this way, a level of confidence is generated (step 135).

$$\text{level of confidence(in \%) that fault is } RC_K = \quad (11)$$
$$\frac{lob(\hat{CR}, RC_K)}{\sum_{i=1}^{M_{RC}} lob(\hat{CR}, RC_i)} \times 100\%$$

For example, if the faults illustrated in Table 1 and the sample variability (standard deviation) shown in FIG. 2 are considered, a table of confidence levels as a function of estimated CR ($\hat{CR}$) may be generated and an assumed level of estimated efficiency of 2% ($\Delta\hat{\eta}$). The result is shown in FIG. 4A in tabular form. The table was produced using (9), (10) and (11) with assumed (illustrative) values of $\Delta\hat{\eta}$=2%, $\sigma_{\Delta\hat{\eta}}^2$=0.08 and $\sigma_{\Delta FP}^2$=0.27.

For example, if the estimated coupling ratio CR was 0.8, a result of 50.5% confidence of a 5th rotor problem, a 26.7% confidence that all rotors were affected, a 15.9% confidence that it was an 8-12 rotor problem, etc., would be derived. The sum of the row of confidences is 100%. From Table 1, 0.83 was the nominal coupling ratio CR value for a 5th rotor problem. The 50.5% confidence reflects the uncertainty induced by the measurements and the diagnostic system. Selecting the root cause having the maximum confidence (step 140) would yield a selection of the $5^{th}$ stage rotor in this example. Alternative, RCs may be combined to yield a higher confidence hypothesis, for example, a 77.2% (50.5%+26.7%) confidence indicates that the problem is with either the $5^{th}$ stage or all of the rotors.

Likewise, if instead, a 4% shift in efficiency ($\Delta\hat{\eta}$) was assessed, a new table of values as shown in FIG. 4B would be assembled. Here, the same CR value of 0.80 would yield a confidence of 91.9% for a 5th rotor fault which is a considerable improvement.

One or more embodiments of the present invention have been described. Nevertheless, it will be understood that various modifications may be made without departing from the spirit and scope of the invention. Accordingly, other embodiments are within the scope of the following claims.

What is claimed is:

1. A performance tracking method for narrowing an assessment of root cause RC to a single turbine or compressor stage, or a combination of stages within at least one gas turbine engine module comprising:
   inputting engine gas path measurement data from a gas turbine engine module;
   performing a gas path analysis on the gas path measurement data to derive % $\Delta$ performance vectors;
   calculating estimated module efficiency $\hat{\eta}$ and flow parameter $\hat{FP}$ deltas ($\Delta$'s) for each % $\Delta$ performance vector;
   calculating a coupling ratio $\Delta\hat{CR}$ for each % $\Delta$ performance vector;
   calculating a variability for each coupling ratio $\Delta\hat{CR}$;
   calculating a level-of-belief lob(x,$RC_i$) for each coupling ratio $\Delta\hat{CR}$ and each root cause $RC_i$;
   calculating a confidence level for each module $RC_k$;
   selecting a module root cause RC having a maximum confidence level; and
   determining from said selected module root cause having said maximum confidence level a single turbine or compressor rotor or a combination of turbine or compressor stages in said at least one gas turbine engine module having deterioration issues.

2. The method according to claim 1 wherein the variability further comprises calculating a mean $\bar{Z}$, a variance $\sigma^2(i)$ and covariance $\sigma_{CR}$ for each % $\Delta$ performance vector.

3. The method according to claim 2 wherein calculating estimated module efficiency $\hat{\eta}$ and flow parameter $\hat{FP}$ deltas ($\Delta$'s) for each % $\Delta$ performance vector is performed using a Kalman filter.

4. The method according to claim 2 wherein the calculated estimated module efficiency $\hat{\eta}$ and flow parameter $\hat{FP}$ deltas ($\Delta$'s) are used to determine and estimate the coupling ratios for each said engine module.

5. The method according to claim 4 wherein the coupling ratio is a linear dependency between the estimated module efficiency $\hat{\eta}$ and flow parameter $\hat{FP}$ deltas ($\Delta$'s).

6. The method according to claim 5 wherein the variability for each coupling ratio $\Delta\hat{CR}$ is calculated empirically and represented by a measurement covariance matrix R.

7. The method according to claim 6 wherein the covariance $\sigma_{CR}$ is obtained empirically through simulation by generating N noisy measurement vectors and calculating the associated N performance estimates.

* * * * *